L. C. NIEWOEHNER.
TRACTION MAT.
APPLICATION FILED AUG. 9, 1919.

1,325,575.

Patented Dec. 23, 1919.

Witness:
Adelaide Kearns.

Inventor:
L. C. Niewoehner;
By
Robert W. Tuttle,
Attorney.

UNITED STATES PATENT OFFICE.

LEWIS C. NIEWOEHNER, OF RICHMOND, INDIANA.

TRACTION-MAT.

1,325,575.   Specification of Letters Patent.   Patented Dec. 23, 1919.

Application filed August 9, 1919. Serial No. 316,435.

*To all whom it may concern:*

Be it known that I, LEWIS C. NIEWOEHNER, a citizen of the United States of America, residing in the city of Richmond, in the county of Wayne and State of Indiana, have invented a new and useful Traction-Mat, of which the following is a full, clear, and comprehensive specification and exposition, the same being such as will enable others to make and use the same with exactitude.

Broadly stated, my object is to provide a traction mat for motor vehicles, which will be strong and durable in construction, simple in character, light in weight, easily placed in operative position, and which can be manufactured and sold at a comparatively low price.

In the operation of automobiles, and especially motor trucks, it frequently occurs that the rear or power driven wheels get into mud-holes, or into loose sand, or the like where it is impossible for the wheels to get sufficient traction or hold to drive the vehicle either forward or backward, and the wheels therefore spin around without accomplishing any movement of the vehicle. The difficulties mentioned are sometimes overcome by means of chains which are made to encircle the tires of the wheels and are secured to the wheel in some manner. One trouble with the usual chains as commonly employed is that it requires considerable time and labor to put them on and take them off, and then they would be required only for a minute of actual use.

Now the particular objects of my invention are to overcome all of the objections above enumerated, at the same time providing a construction which is very simple in character, occupying but a minimum of space in one's tool-box, and when required can be simply spread on the ground in front of a power driven wheel without the necessity of lifting the vehicle and without attaching it to the wheel, and then after the wheel has been extricated the device may be gathered up and stored in the vehicle, all of which would consume but a moment of time. In fine, with the use of my invention the wheel may be extricated from its difficulty and the vehicle again be traveling forward in less time than it would take to attach ordinary chains in position or to take them off.

Other objects and advantages of the invention will suggest themselves in the course of the following description, and that which is new will be correlated in the appended claims.

The preferred means for carrying out my invention in a practical manner is shown in the accompanying drawings, in which—

Figure 1:
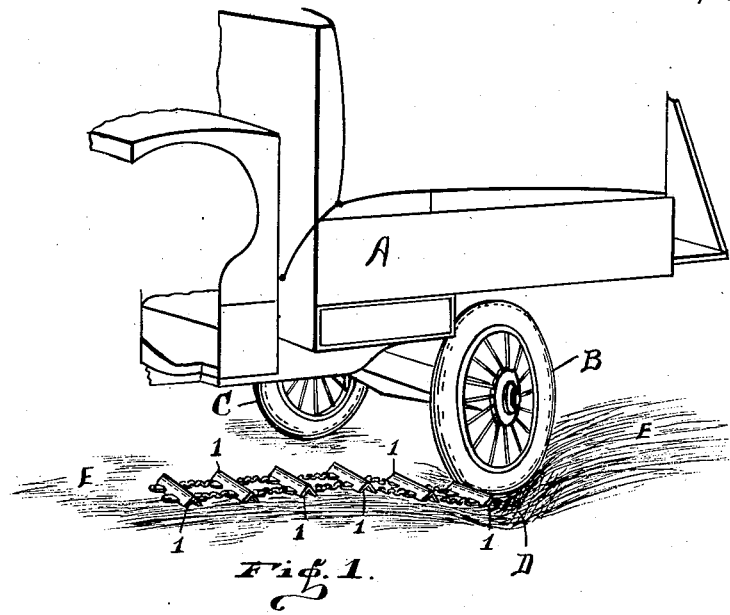
Figure 2:
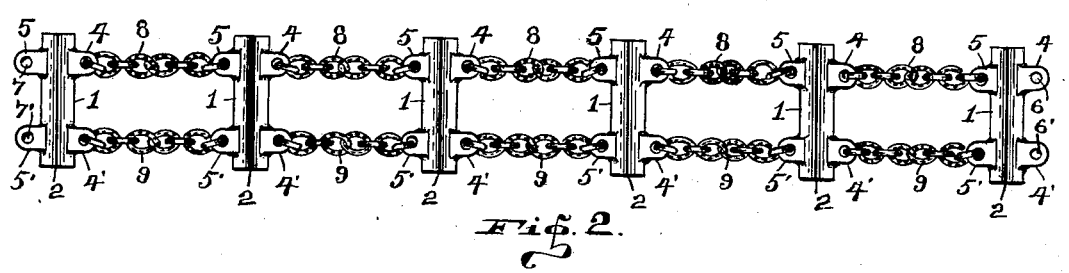
Figure 3:
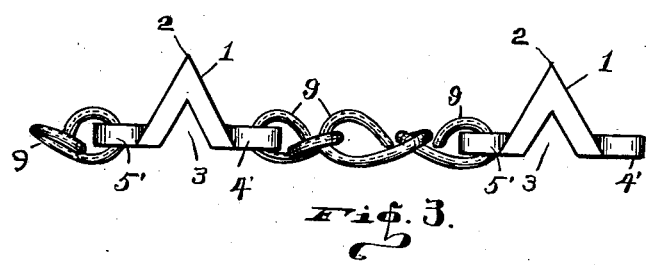

Figure 1 is a perspective view of a portion of a motor vehicle, showing the power wheels and my invention in actual practice in connection with one of said wheels. Fig. 2 is a plan view of my complete invention alone. And Fig. 3 is a side elevation of a portion of my device on an enlarged scale from that of the other views of the drawings, and on a scale which might be employed in actual practice.

Similar indices denote like parts throughout the several views.

In order that the construction, the manipulation, and the advantages of my invention may be more fully understood and appreciated, I will now take up a detailed description thereof, in which I will set forth the same as fully and as comprehensively as I may.

In the drawings letter A denotes a portion of a motor vehicle which is mounted on the drive wheels B and C, in the usual manner.

My invention comprises a plurality of cross-bars 1, which are inverted V-shape in cross-section, whereby each has an upper edge or peak as denoted at 2 in Figs. 2 and 3, and an inverted V-shaped channel in its under face, as denoted at 3, in Fig. 3. The edge 2 and the channel 3 extend parallel with their respective cross-bars, as shown. Extending out, that is forward and rearward from the lower edges of each of the cross-bars, are a plurality of ears which are formed integral with their respective cross-bars, there being two of said ears on each side of each cross bar, as the ears 4 and 4' on one side, and the ears 5 and 5' on the opposite side. Each of the ears 4 and 4' has an aperture or eye, 6 and 6' respectively, therethrough, as indicated at the right-hand in Fig. 2. And each of the ears 5 and 5' has an aperture or eye, 7 and 7' respectively, therethrough, as indicated at the left-hand in Fig. 2.

All of the said cross-bars, usually six in number, are spaced some distance apart and are arranged parallel with each other and are flexibly connected each by a pair of tie-chains 8 and 9.

On end of each of the chains 8 is permanently hooked into an aperture 6 of an ear 4 and its other end is permanently hooked into an aperture 7 of an ear 5. Likewise one end of each of chains 9 is permanently hooked into an aperture 6' of an ear 4', and its other end is permanently hooked into an aperture 7' of an ear 5'.

By the above I provide a single length flexible device of great strength yet adapted to be easily folded and occupy a minimum of space when not in use.

As indicated in Fig. 1 the wheel B is in a depression below the surface of the roadway E, and we will assume that the depression is slick or contains dry sand so that the wheel B spins therein when power is applied. To overcome said trouble my device is spread out on the ground in line with the wheel B and extending in the direction the wheel is expected to travel, one end of my device, that is the first cross-bar 1 is pressed against the periphery of the tire of the wheel and in contact with the ground. If now power be applied to revolve the wheel B it is evident that the wheel will engage the peaks 2 of the cross-bars, pressing the device against the material or ground on which the wheel rests, and thereby enable the wheel to attain sufficient traction to cause it to pull out of the depression and thereby accomplish the desideratum. Then as soon as the wheel has run off of the device the device may be picked up and stored for future use.

It is evident that two of my devices should be carried, one for each of the two wheels C and D, but usually it will be necessary to use but one at a time.

I have found in practice that a device of this character gives much better results and saves time and expense, and without injury to the roadway or to the tires.

Having now fully shown and described my invention, what I claim and desire to secure by Letters Patent of the United States, is—

1. A traction mat comprising a plurality of cross-bars located parallel with each other and connected by tie-chains whereby the bars are spaced apart, each of said bars being V-shaped in cross-section forming a channel in its lower face.

2. A traction mat formed in a single length to be spread on the surface of the ground and comprising a plurality of cross bars which are V-shaped in cross section, ears formed integral with each side of each of said bars, and chains having their ends secured in said ears and connecting the bars substantially as shown.

3. A traction mat adapted to lie flat on the ground, comprising a plurality of cross-bars formed V-shape in cross-section forming an edge at the top and a V-shaped channel in the lower face, said cross bars being spaced apart parallel with each other, ears integral with each side of each cross-bar, and a pair of chains connecting each two of the cross-bars, all substantially as shown and described.

In testimony whereof I have hereunto subscribed my name to this specification in the presence of two subscribing witnesses.

LEWIS C. NIEWOEHNER

Witnesses:
ROBT. W. RANDLE,
R. E. RANDLE.